United States Patent [19]
Petkov

[11] Patent Number: 5,509,185
[45] Date of Patent: Apr. 23, 1996

[54] NEEDLE BOARD STRIPPING PRESS APPARATUS

[76] Inventor: Ilia D. Petkov, 735 Royal Crown La., Colorado Springs, Colo. 80906

[21] Appl. No.: 259,882

[22] Filed: Jun. 15, 1994

[51] Int. Cl.$^6$ .................................................. B23P 19/04
[52] U.S. Cl. ...................... 29/252; 29/281.3; 29/283.5; 29/282
[58] Field of Search .................... 29/426.5, 251, 29/252, 243.517, 281.3, 283.5, 282, 259; 269/910; 100/295

[56] References Cited

U.S. PATENT DOCUMENTS

| | | | |
|---|---|---|---|
| 1,358,418 | 11/1920 | Craig | 29/251 |
| 1,650,818 | 11/1927 | Buffington et al. | 29/251 |
| 2,387,839 | 10/1945 | Frost | 29/251 |
| 3,286,338 | 11/1966 | Bohr | 29/243.517 |
| 3,512,242 | 5/1970 | Harvis | 29/252 |
| 4,051,588 | 10/1977 | Conkel | 29/252 |
| 4,169,412 | 10/1979 | Stelmasik et al. | 29/251 |
| 4,620,352 | 11/1986 | Sulej | 29/251 |
| 4,824,004 | 4/1989 | Hanson | 269/910 |

Primary Examiner—Robert C. Watson
Attorney, Agent, or Firm—Phillip A. Rein

[57] ABSTRACT

A needle board stripping press apparatus including 1) a main support table frame assembly; 2) a stationary top plate press assembly mounted on the main support table frame assembly; 3) a movable needle board support assembly connected to the stationary top plate press assembly and reciprocally movable vertically thereon; 4) a cam actuator and power drive assembly connected to the main support table frame assembly and engagable with the movable needle board support assembly to cause subject reciprocal movement; and 5) an electrical drive and control assembly operably connected to the cam actuator and power drive assembly. The movable needle board support assembly is provided with a needle board support frame assembly to receive a needle board assembly securely and releasably mounted thereon. The movable needle board support assembly moves the attached needle board assembly upwardly into engagement with the stationary top plate press assembly to hold the needle members in an upright position and subsequently contact a transverse support plate member which causes ejection of the needle members. Through the electrical drive and control assembly, the movable needle board support assembly is automatically cycled from a home position to an ejection position and returned to the home position. Air cylinder detent assemblies engage the movable needle board support assembly for downward movement thereof.

21 Claims, 17 Drawing Sheets

DESCRIPTIVE ADDENDUM TO ELECTRICAL SCHEMATIC OF FIG. 8

| REF. | DESCRIPTION | QTY. |
|---|---|---|
| M-1 | MOTOR 3/4 H.P. 1750 RPM 480V | 1 |
| SOL-1 | AIR CYLINDER SOLENOID | 1 |
| LS-3 | AIR CYLINDERS | 1 |
| LS-2 | HOME PROX. | 1 |
| LS-1 | DOOR PROX | 1 |
|  | TIMER SOCKET | 1 |
| TR-1 | TIMER | 1 |
|  | RELAY SOCKET | 4 |
| CR 2-5 | RELAY | 4 |
| CR-1 | MCR | 1 |
| PL-3 | CYCLE COMPLETE | 1 |
| MCS-1 | FORWARD, REVERSE | 1 |
| S-4 | JOG | 1 |
| S-3 | CYCLE START | 1 |
| S-2 | CYCLE STOP | 1 |
| S-1 | START, STOP | 1 |
|  | FUSE HOLDER | 1 |
| FU 6 | FUSE | 1 |
| T-1 | TRANSFORMER | 1 |
|  | FUSE HOLDER | 1 |
| FU 4-5 | FUSE | 2 |
| OL-1 | MOTOR OVERLOAD | 1 |
| MS 1-2 | MOTOR STARTER | 1 |
|  |  | 2 |
| FU 1-3 | FUSE | 3 |
| D-1 | DISCONNECT | 1 |

FIG. 8A

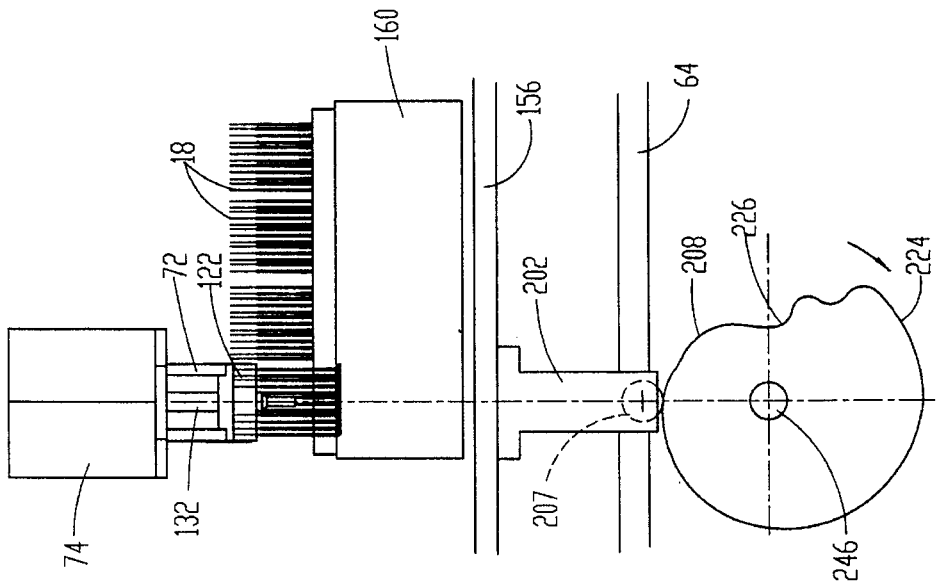
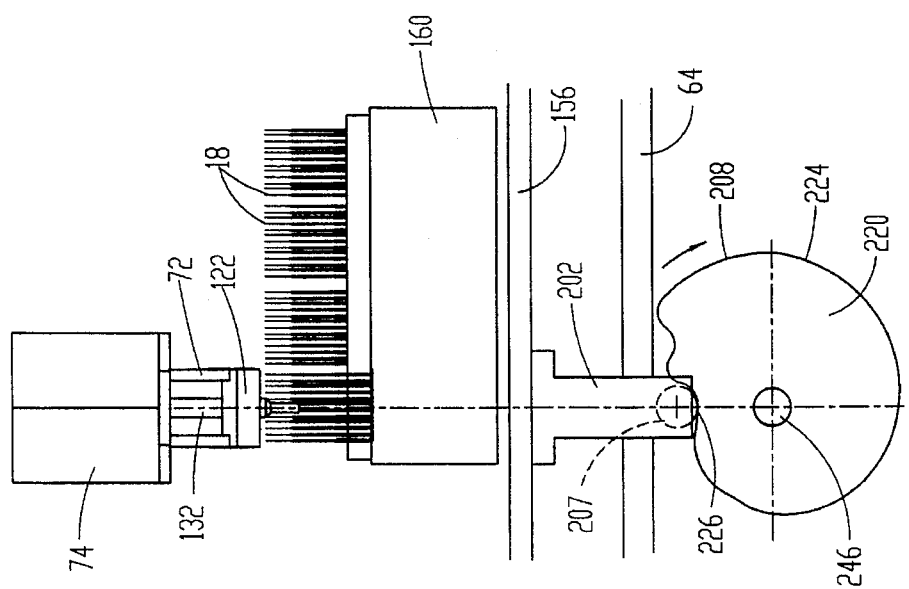

NEEDLE BOARD STRIPPING PRESS APPARATUS

PRIOR ART

A patent search ws not conducted on this invention.

BACKGROUND OF THE INVENTION

The needle board stripping press apparatus and method of use of this invention was conceived in order to overcome a problem in removing needle members from a needle support board member in a needle board assembly. The needle board assembly may contain thousands of needle members which have become damaged, such as broken, crooked, or worn out and fatigued. The needle board assembly is used in the textile or other sewing industries.

More specifically, the needle board assembly includes the needle support board member having a plurality of rows of needle support holes therein, each with a needle member mounted therein. Each needle member has an L-shaped hook end section which is integral with a support mid section which, in turn, is integral with an outer initial penetrating section. The support mid section is of a substantial thickness but the initial penetrating section is of a much smaller diameter and having an outer material penetrating end point.

The needle support board member includes a plurality of rows of needle members in sections, such as three, four, or more sections, and the prior art practice has been to remove the worn out or fatigued needles by hand labor through use of a pair of pliers or the like which is very time consuming resulting in considerable machinery downtime.

The needle board stripping press apparatus and method of use of this invention is operable to provide machinery to eject an entire section of needle members simultaneously in a matter of seconds. It is acknowledged that with this invention all of the needle members which are fatigued will be removed but, due to the low cost of each needle member, it is economically feasible to eject and remove the entire section of needle members, both the good and bad ones, and replace the same with new needle members.

PREFERRED EMBODIMENT OF THE INVENTION

In one preferred embodiment of this invention, a needle board stripping press apparatus is provided in order to efficiently and effectively remove simultaneously a plurality of the needle members mounted on the needle support board member.

The needle board stripping press apparatus includes 1) a main support table frame adapted to be supported on a support surface; 2) a stationary top plate press assembly secured to the main support table frame assembly; 3) a movable needle board support assembly mounted on the main support table frame assembly operable to be selectively movable towards the stationary top plate press assembly during a needle members removing operation; 4) a cam actuator and power drive assembly connected to the main support table frame assembly and operable to selectively move the movable needle board support assembly; and 5) an electrical drive and control assembly operably connected to the cam actuator and power drive assembly to control overall operation as will be noted.

The main support table frame assembly includes a top support plate assembly mounted on support leg assemblies and provided with a needle discharge chute to receive and direct the needle members ejected from the needle support board member.

The stationary top plate press assembly includes 1) a pair of spaced guide post assemblies having one end thereof secured to the top support plate assembly of the main support table frame assembly; 2) a top plate support yoke assembly secured to upper ends of the guide post assemblies; and 3) a pair of air cylinder detent assemblies connected to upper spaced outer portions of the top plate support assembly.

The top plate support yoke assembly includes a pair of parallel spaced upright yoke members interconnected by a transverse support plate member having a needle strike plate assembly secured thereto.

The needle strike plate assembly includes a material support housing operable to receive and support a needle support member preferably constructed of a felt material. During a needle member removing operation, the needle support member initially receives the penetrating end point of the needle members in order to hold in an upright condition before striking the transverse support plate member during a method of removing the needle members from the needle support board member.

The movable needle board support assembly includes 1) a needle board support frame assembly mounted about the guide post assemblies of the stationary top plate press assembly for selective reciprocal movement; 2) a guide support and bearing assembly connected to the needle board support frame assembly to provide support and assure aligned reciprocal movement; and 3) an actuator cam roller assembly connected to the needle board support frame assembly and operable to achieve precise reciprocal movement.

The needle board support frame assembly includes 1) a main board support plate member; 2) a vertical support frame assembly connected to the main board support plate member operable to receive and support a needle board assembly thereon in a releasable clamped manner; and 3) a pair of spaced parallel guide support members having the vertical support frame assembly mounted thereon for reciprocal horizontal movement to place a selective section of the needle members on the needle support board member in vertical alignment with the transverse support plate member of the top support plate assembly for simultaneous removal of the section of the needle members.

The actuator cam roller assembly includes a cam roller assembly connected to the main board support plate member having a roller member which is operably engagable with a cam actuator member. The cam actuator member is connected to a power drive shaft member in the cam actuator and power drive assembly for conjoint rotation therewith.

The roller member is engagable with an outer surface of the cam actuator member to cause selective vertical reciprocal movement of the needle board support frame assembly during a needle members removing operation in the method of use of this invention.

The cam actuator and power drive assembly includes a power drive shaft assembly connected to the main support table frame assembly and having a motor and gear box assembly connected to the power drive shaft assembly. The power drive shaft assembly includes the power drive shaft member having the cam actuator member thereon and being connected by bearing block support members to an undersurface of a top plate member of the top support plate assembly of the main support table frame assembly.

The motor and gear box assembly includes a power drive motor member connected to a reducer gear box member which, in turn, is connected to the power drive shaft assembly and operable to rotate the cam actuator member to cause raising and lowering of the movable needle board support assembly during the method of operation in removing the needle members from the needle support board member.

The electrical drive and control assembly includes 1) a control panel assembly having a plurality of control members thereon for selective operation of this invention; 2) an electrical schematic diagram illustrates the electrical operation of this invention; 3) a pneumatic schematic diagram illustrates the use of a pneumatic system to assist in lowering of the movable needle board support assembly after a needle removing method step; and 4) a cam actuated proximity limit switch assembly is connected to the power drive shaft member and the main support table frame assembly during operation thereof.

The operation of the electrical drive and control assembly will be described in detail.

OBJECTS OF THE INVENTION

One object of this invention is to provide a needle board stripping press apparatus which is operable to simultaneously remove hundreds of needle members in a needle board assembly rapidly which is far superior and overcomes the prior art method of hand removing individual needle members.

One other object of this invention is to provide a needle board stripping press apparatus including 1) a main support table frame assembly with a stationary top plate press assembly mounted thereon; 2) a movable needle board support assembly supporting a needle board assembly mounted on the main support table frame assembly; and 3) a power and control means operably connected to the movable needle board support assembly for controlled vertical movement and engagement of needle members in the needle board assembly with the stationary top plate press assembly to remove hundreds of the needle members therefrom simultaneously.

Another object of this invention is to provide a needle board stripping press apparatus including a movable needle board support assembly having a needle board assembly with needle members mounted thereon which is automatically operable through a cycle operation to move the needle board assembly vertically into contact with a stationary top plate press assembly to remove a section of adjacent rows of the needle members from the needle support board member; and ejecting the needle member with a minimum amount of time and effort involved due to the automatic operation of the needle board stripping press apparatus of this invention.

One other object of this invention is to provide a needle board stripping press apparatus including a stationary top plate press assembly with a top plate support assembly having a needle strike plate assembly provided with a needle support member of a penetratable material, such as layers of felt, which initially receives a thin penetrating end point and initial penetration section of respective, adjacent, vertical, parallel needle members therein to hold in the aligned vertical condition before striking a hardened transverse support plate member in a top plate support yoke assembly for subsequent depression and removal of adjacent rows of the needle members.

A further object of this invention is to provide a needle board stripping press apparatus which provides an economical time-saving method of removing a section or a plurality of rows of needle members from a needle support board member in a minimum amount of time which is economical to manufacture; sturdy in construction; automatic in operation; providing numerous safeguards during operation; and substantially maintenance free.

Various other objects, advantages, and features of the invention will become apparent to those skilled in the art from the following discussion, taken in conjunction with the accompanying drawings, in which:

FIGURES OF THE INVENTION

FIG. 8A is a chart describing the elements of the components noted in FIG. 8;

FIGS. 14–19 are schematic diagrams illustrating the method of operation of the needle board stripping press apparatus of this invention.

Figure 1:
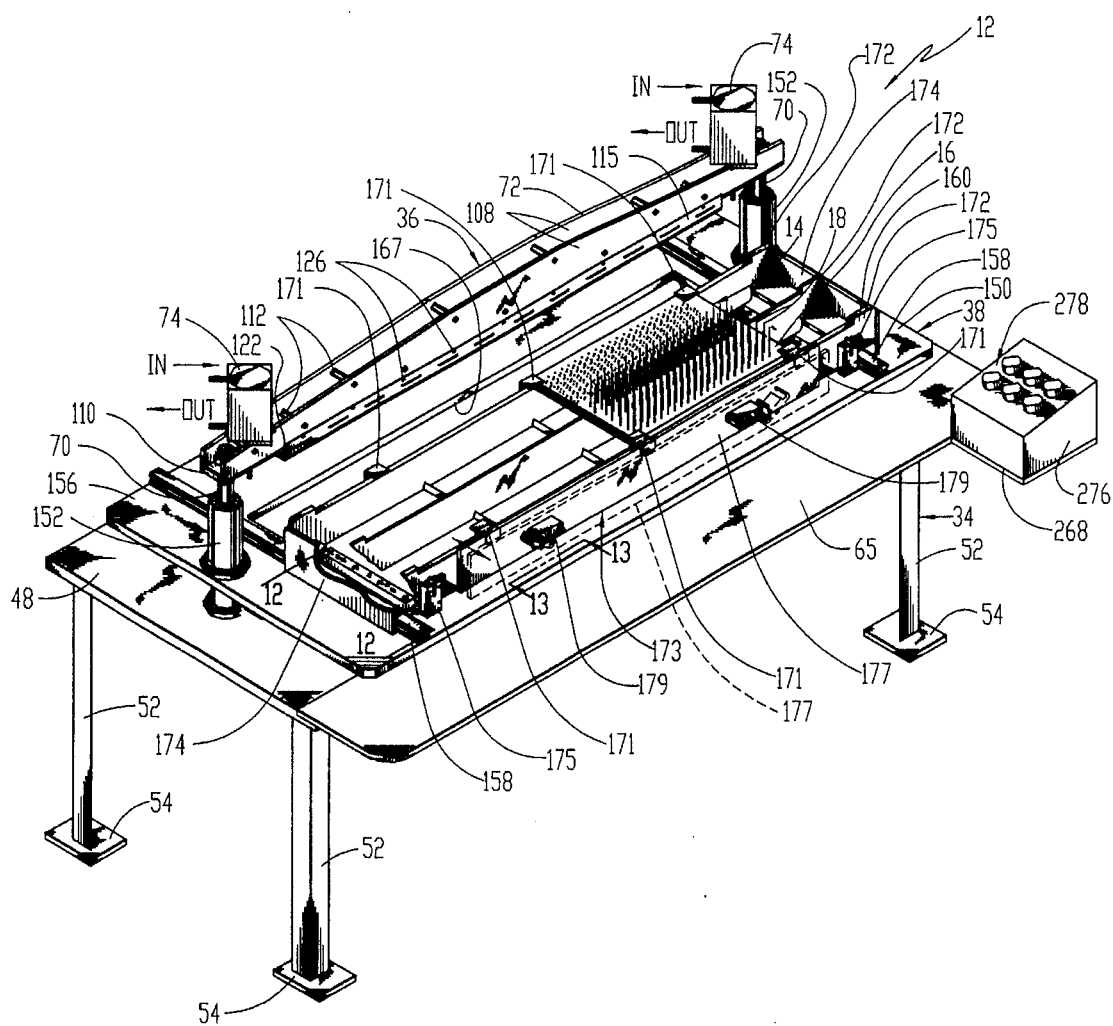
FIG. 1 is a perspective view of the needle board stripping press apparatus of this invention.

The following is a discussion and description of preferred specific embodiments of the needle board stripping press apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, a needle board stripping press apparatus, indicated generally at 12, is operable with a needle board assembly 14 to automatically and simultaneously remove a section comprising a plurality of rows of needle members 18 from the needle board assembly 14.

The needle board assembly 14 includes a needle support board 16 with needle members 18 mounted thereon and having a needle retainer board 19 secured to an outer surface of the needle support board member 16 for holding the needle members 18 therein during a sewing operation which is not part of this invention.

The needle support board member 16 can be constructed of a plastic or metal material, such as aluminum, having a plurality (hundreds or thousands) of needle support holes 20, each having an individual needle member 18 therein. The needle members 18 are in adjacent, spaced parallel relationship to each other for use in a felt manufacturing operation.

The needle members 18 are provided with a hook end section 21 of generally L-shape which is integral with a support mid section 22 which, in turn, is integral with an initial penetrating section 24. The support mid section 22 is of a diameter similar to the hook end section 21 but tapered to a much thinner initial penetrating section 24 for use in the sewing operation.

The initial penetrating section 24 ends in an outer penetrating end point 25 for ease in initial penetration of layers of material, such as felt, used in a manufacturing process.

As shown in FIG. 1, the needle board stripping press apparatus 12 includes 1) a main support table frame assembly 34 to be mounted on a support surface; 2) a stationary top plate press assembly 36 connected to the main support table frame assembly 34; 3) a movable needle board support assembly 38 which is connected to the stationary top plate press assembly 36; 4) a cam actuator and power drive assembly 40 connected to the main support table frame assembly 34 and operably connected to the movable needle board support assembly 38; and 5) an electrical drive and control assembly 42 which is operably connected to the cam actuator and power drive assembly 40 to achieve vertical reciprocal movement of the movable needle board support assembly 38.

The main support table frame assembly 34 includes 1) a plurality of support leg assemblies 44; 2) a lateral support assembly 46 interconnected to the support leg assemblies 44; 3) a top support plate assembly 48 connected to the support leg assemblies 44; and 4) a needle discharge chute 51 connected to the top support plate assembly 48.

Each support leg assembly 44 is provided with vertical leg members 52 preferably of angle iron construction having a bottom plate member 54 secured to a lower end and a top plate member 56 secured to an upper end thereof.

The lateral support assembly 46 includes front and back support members 58, 60 and end support members 62, all of which are secured as by welding to mid portions of the leg members 52 to achieve substantial rigidity thereto.

The top support plate assembly 48 includes 1) a top plate member 64; 2) an extension plate member 65 secured and laterally extended from the top plate member 64; and 3) a plurality of anchor holes 68 to receive anchor bolt members 67 therein for attachment to the respective spaced top plate members 56 of the support leg assemblies 44.

The needle discharge chute 51 has a bottom wall 53 integral with upwardly extending side walls 55 which are connected to support legs 57. The support legs 57 are supported and secured to the top plate member 64. The bottom wall 53 and side walls 55 define an opening 59 therebetween through which the ejected needle members 18 are passed therefrom during a method of operation of the needle board stripping press apparatus 12 as will be explained.

Figure 2:
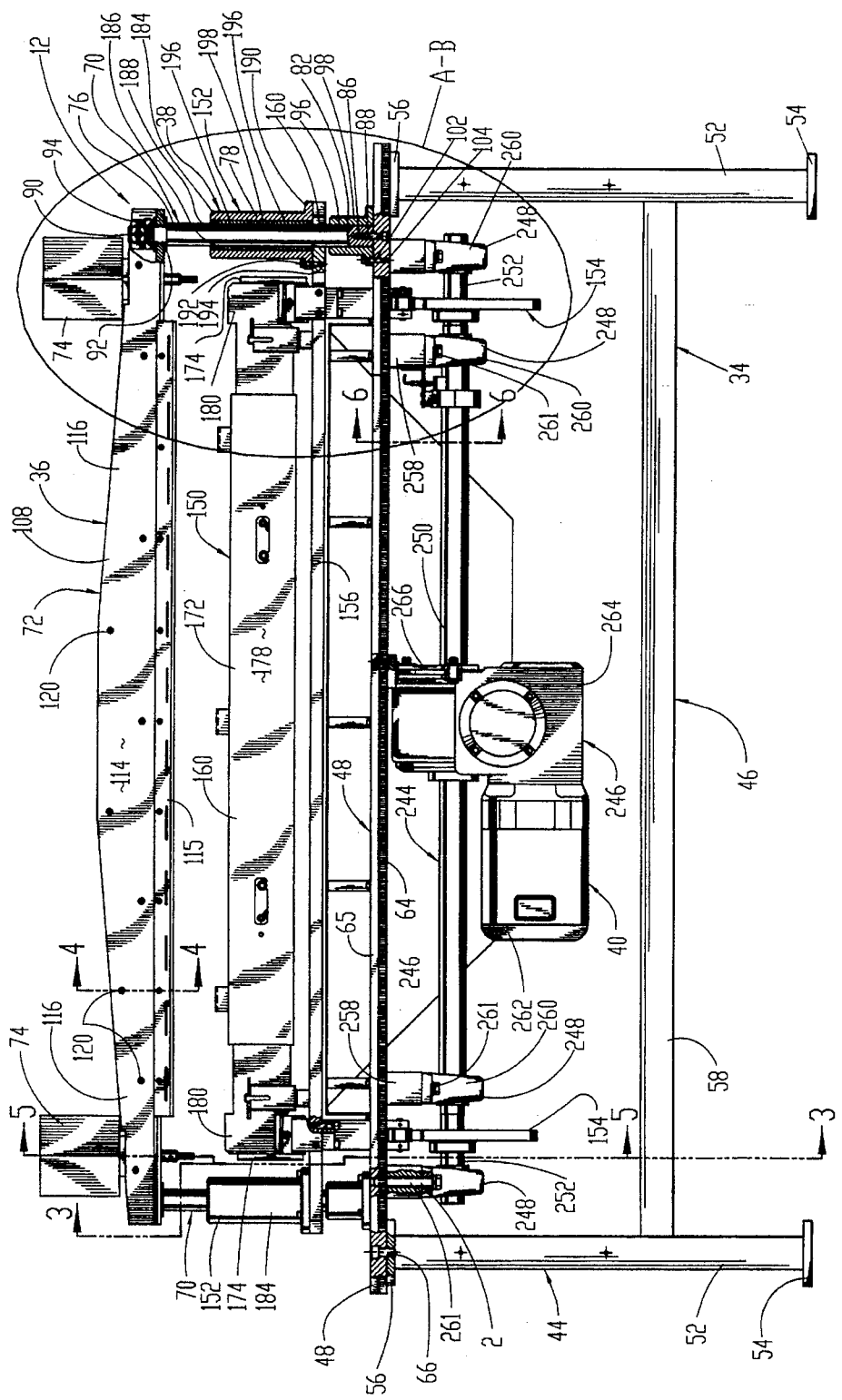
FIG. 2 is a front elevational view thereof with portions broken away for clarity.
Figure 3:
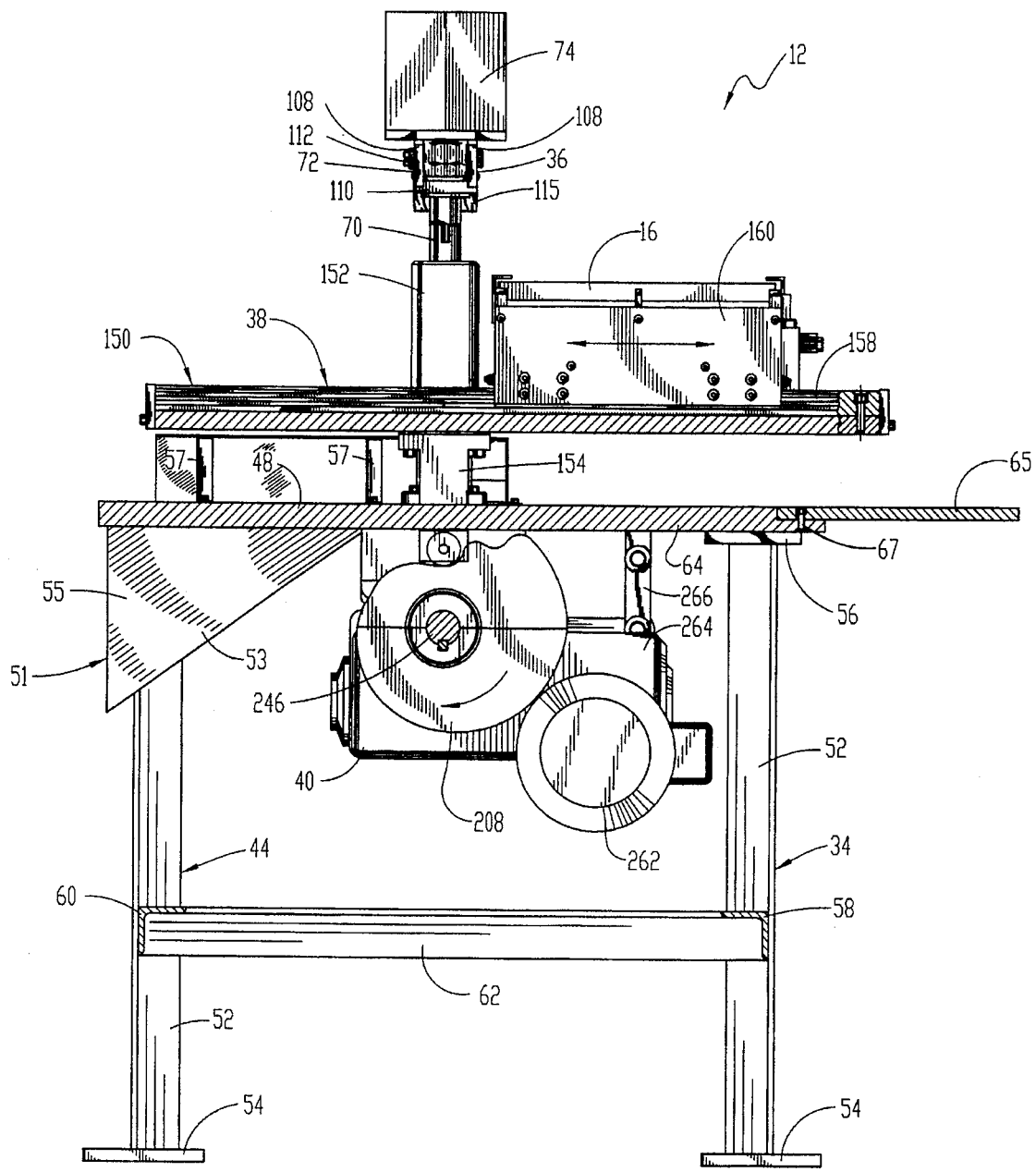
FIG. 3 is a sectional view taken along line 3—3 in FIG. 2.
Figure 4:
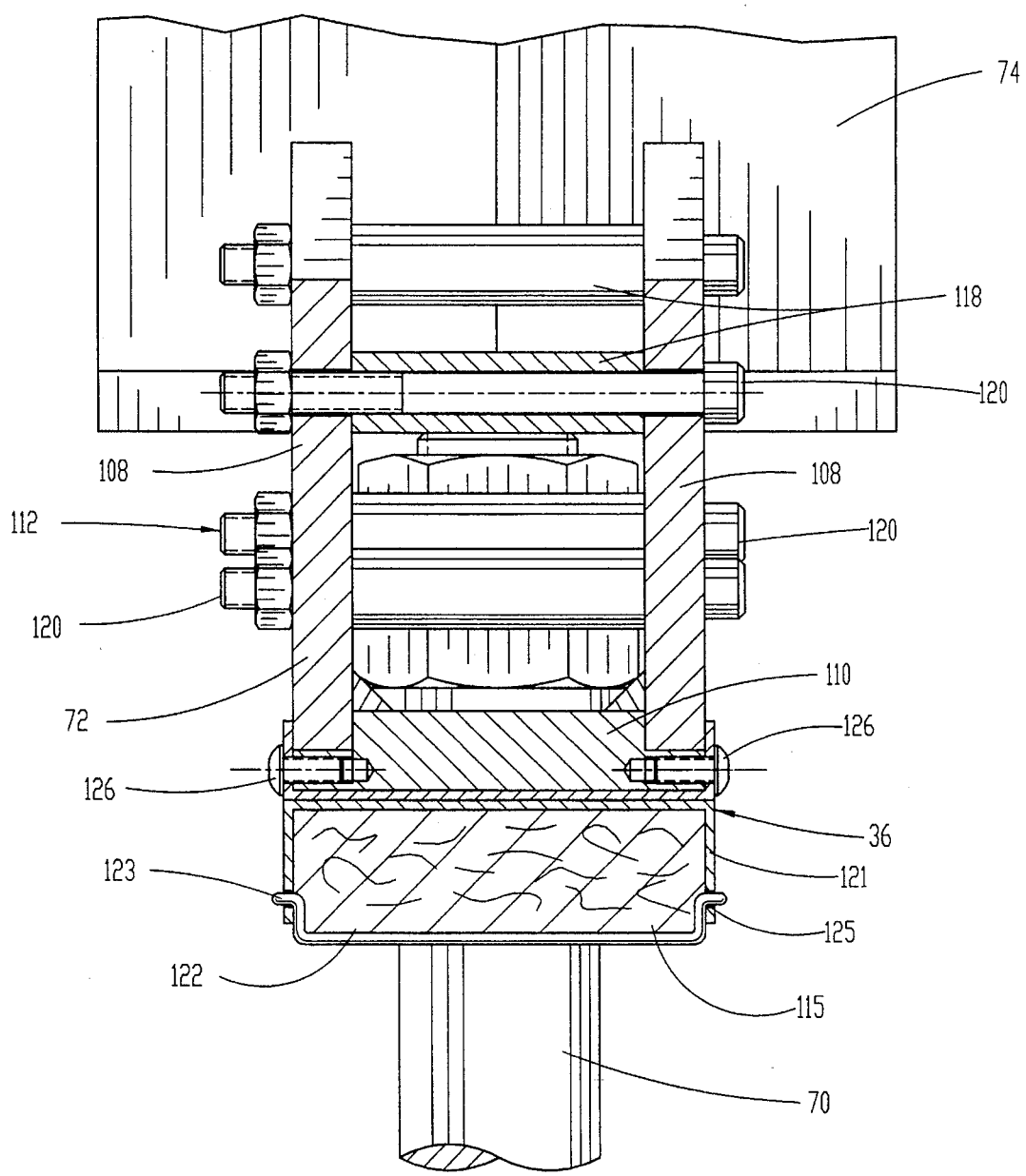
FIG. 4 is an enlarged fragmentary sectional view taken along line 4—4 in FIG.

As noted in FIG. 2, the stationary top plate press assembly 36 is provided with a pair of guide post assemblies 70 interconnected at upper ends thereof to a top plate support yoke assembly 72 and having a pair of air cylinder detent assemblies 74 mounted on outer spaced ends of the top plate support yoke assembly 72.

As best shown in FIG. 2, each guide post assembly 70 includes a guide post member 76 mounted on a guide post support member 78 which is secured to an upper surface of the top plate member 64 of the top support plate assembly 48. Each guide post member 76 is provided with a main post body 80 having a lower connector section 82 and an upper connector section 84.

The lower connector section 82 is provided with a threaded anchor hole 86 to receive a bolt member 88 therein which is extended through an opening in the top plate member 64.

The upper connector section 84 is provided with a threaded end portion 90 extended through an opening in the top plate support yoke assembly 72 and having washer members 92 and nut members 94 mounted thereon to achieve rigid anchoring.

Each guide post support member 78 is provided with a central post opening 96 to receive a guide post member 76 therethrough and having an anchor flange 98 extended laterally therefrom. The anchor flange 98 is provided with connector holes 104 to receive an anchor bolt 102 therethrough to achieve vertical stability to the guide post member 76.

The top plate support yoke assembly 72 includes 1) a pair of spaced parallel upright yoke members 108 interconnected by a transverse support plate member 110; 2) a yoke connector assembly 112 interconnecting the upright yoke members 108; and 3) a needle strike plate assembly 115 connected to the transverse support plate member 110.

Each parallel, upright yoke member 108 is provided with a central support section 114 integral at outer ends with a tapered connector end section 116.

The yoke connector assembly 112 includes a plurality of spacer tubes 118 placed between openings in the parallel, upright yoke members 108 and having nut and bolt members 120 extended therethrough to maintain the parallel spacing and rigid connection of the upright yoke members 108.

Figure 6:
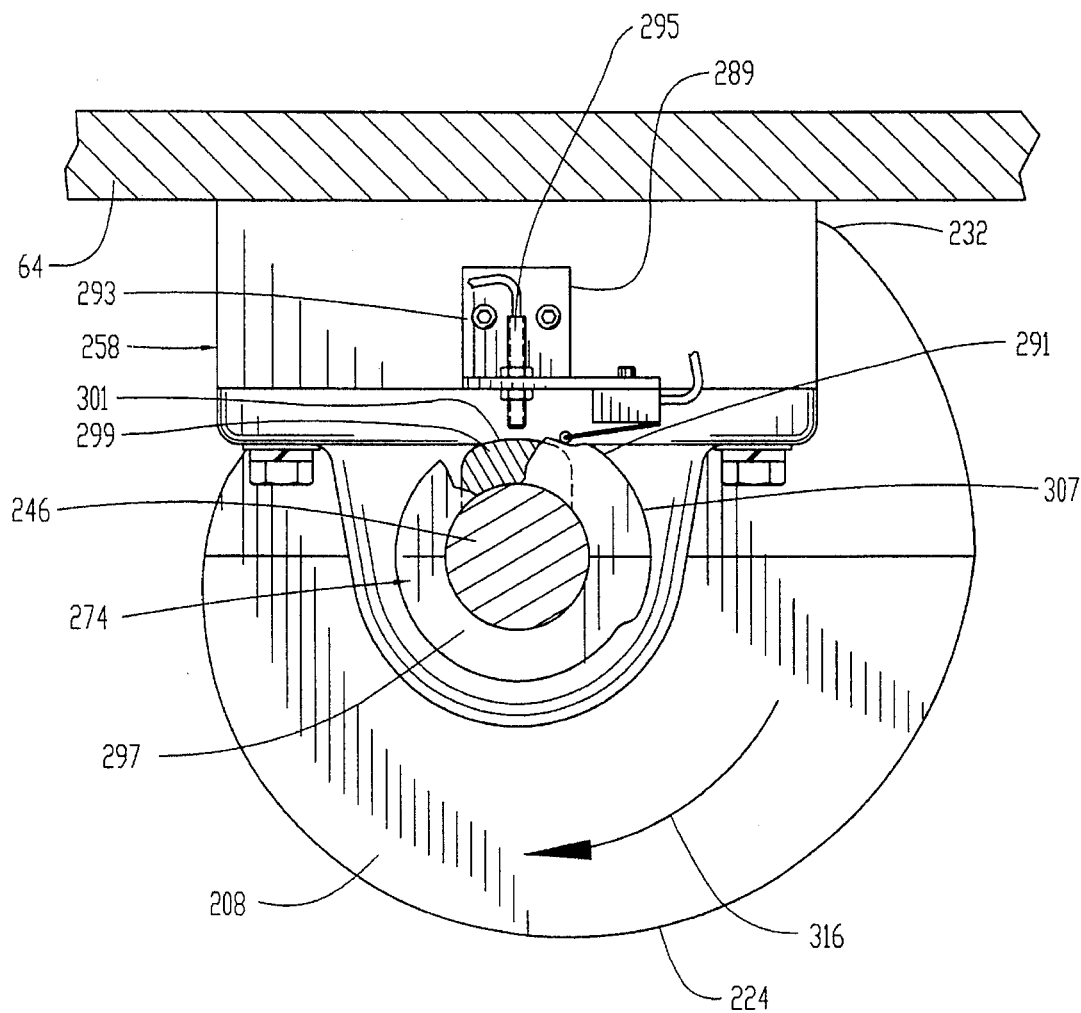
FIG. 6 is an enlarged sectional view taken along line 6—6 in FIG. 2.
Figure 7:
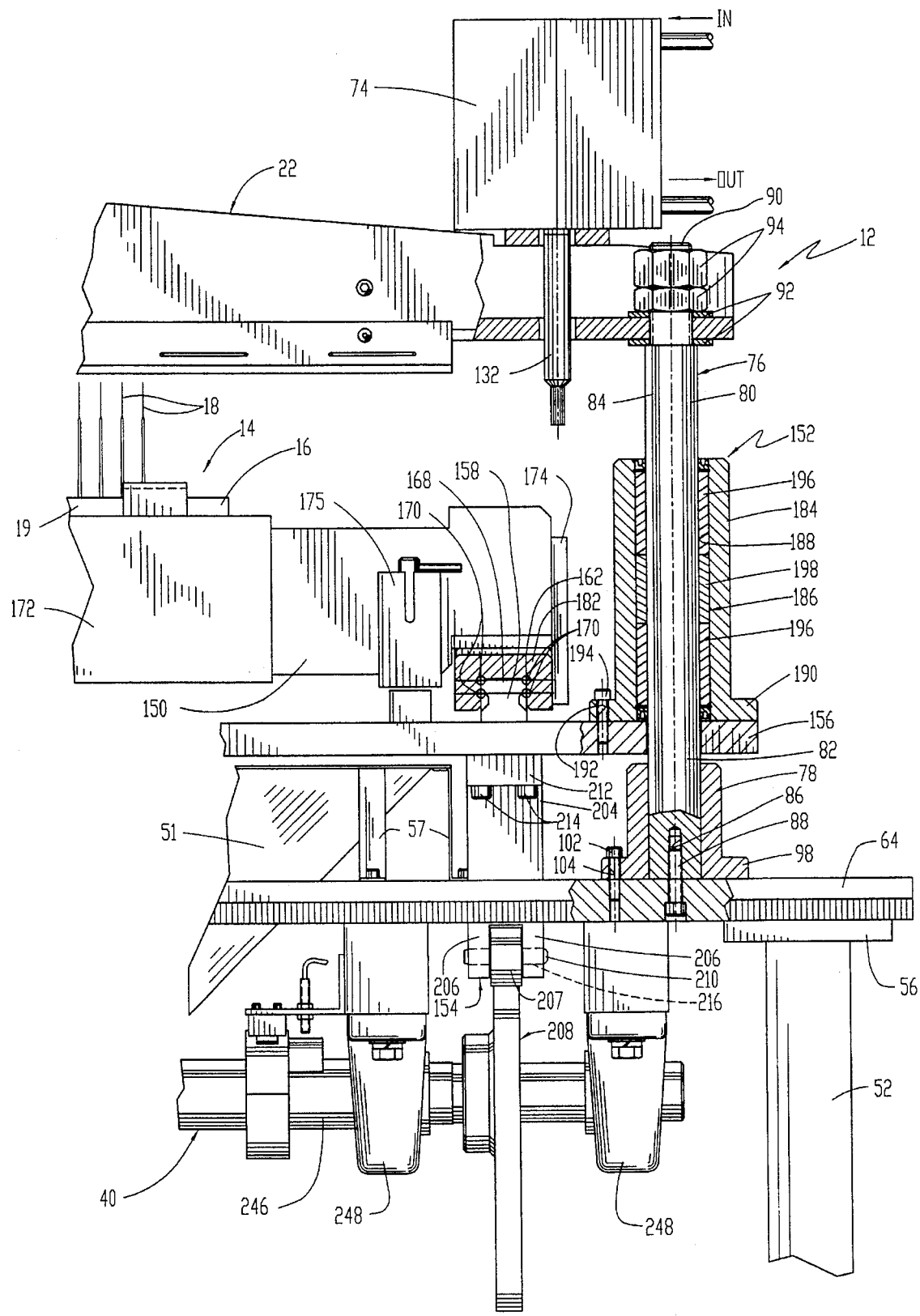
FIG. 7 is a view from an enclosed circle A-B in FIG. 2 having portions broken away for clarity.

The transverse support plate member 110 is welded to the adjacent yoke members 108. Outer ends of the transverse support plate member 110 are provided with connector openings therein to receive the upper connector section 84 of the respective guide post members 76 with the washer members 92 and the nut members 94 mounted thereon as shown in FIGS. 2 and 6.

The needle strike plate assembly 115 includes a material support housing 121 secured by bolt members 126 to the transverse support plate member 110 and having a needle support member 122 connected thereto by a material support member 123.

The material support housing 121 has a plurality of openings to receive the bolt members 126 on both sides of the transverse support plate member 110 for anchoring thereto.

The material support member 123 is an elongated wire member which is woven through adjacent support holes 125 in outer edges of the material support housing 121. The material support member 123 extends repeatably transversely of the needle support member 122 to hold firmly within the material support housing 121.

As the material support member 123 is a thin wire member, this does not hinder movement of the initial penetrating section 24 of the needle members 18 into the needle support member 122 during the method of removing the needle members 18 from the needle support board member 16.

The needle support member 122 is preferably constructed of a special material, such as felt, and extends the length of the material support housing 121. The needle support member 122 is of a predetermined thickness, such as 1" to 1½", but would be at least equal or greater than the length of the initial penetrating section 24 of the needle members 18.

The reason for use of felt or similar material for the needle support member 122 is in order to initially receive the penetrating end point 25 of the initial penetrating section 24 of the needle members 18 in the method of operation so as to hold each needle member 18 in a vertical upright position before engaging the transverse support plate member 110 for removal of needle members 18 from the needle support board member 16. The needle support member 122 material has a low function characteristic to achieve ease of removal of the needle members 18 therefrom.

Figure 5:
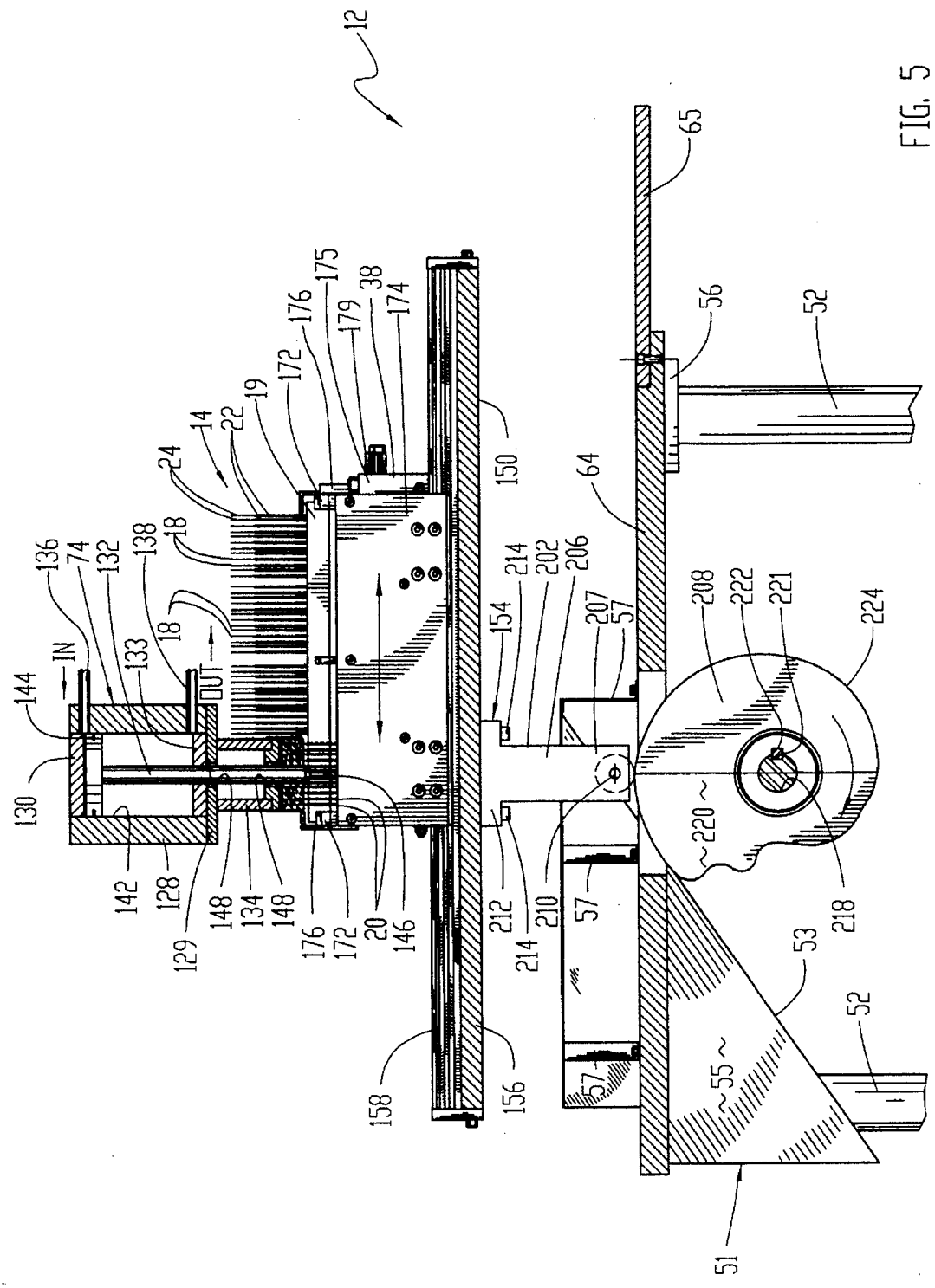
FIG. 5 is an enlarged fragmentary sectional view taken along line 5—5 in FIG. 2 having a needle board assembly mounted thereon.

As best shown in FIG. 5, each air cylinder detent assembly 74 includes 1) a cylinder housing member 128; 2) a piston member 130 connected to a piston rod member 132 mounted within the cylinder housing member 128; 3) a lower wall 129 of the cylinder housing member 128 is secured as by welding to adjacent upper surfaces of the upright yoke members 108 of the top plate support yoke assembly 72; and 4) an air inlet/discharge line 136 and an air discharge/inlet line 138 are connected to the cylinder housing member 128 which has an inner cylinderical chamber 142.

The piston member 130 has an outer O-ring seal 144 to contact inner walls of the cylinder chamber 142 on reciprocal movement to prevent air leakage about the piston member 130.

The piston rod member 132 has an outer contact end section 146 to contact and move a portion of the movable needle board support assembly 38 for reasons to be explained.

A rod seal member 133 is mounted within the cylinder chamber 142 and engagable with an outer surface of the piston rod member 132 to provide a sealing function therewith on reciprocal movement of the piston member 130.

The air inlet/discharge line 136 and air discharge/inlet line 138 are connected to a solenoid member to selectively move the piston rod member 132 during a method of operation as will be explained.

The lower wall 129 and the transverse support plate member 110 are provided with respective spaced detent openings 148 to receive the piston rod member 132 therethrough.

As shown in FIG. 2, the movable needle board support assembly 38 includes 1) a needle board support frame assembly 150; 2) a guide post support and bearing assembly 152 connected to the needle board support frame assembly 150; and 3) an actuator cam roller assembly 154 connected to the needle board support frame assembly 150 and having a portion thereof connected to the cam actuator and power drive assembly 40.

The needle board support frame assembly 150 includes 1) a main board support plate member 156; 2) a pair of spaced guide members 158 secured to the main board support plate member 156; 3) a vertical support frame assembly 160 mounted for reciprocal horizontal movement on the guide members 158; 4) needle board clamp assembly 176; 5) a frame locator assembly 175; and 6) parallel spaced guide support members 162 connected to the vertical support frame assembly 160.

The main board support plate member 156 is provided with 1) a pair of spaced post receiving openings 164 to receive respective ones of the guide post members 76 therethrough; 2) cam receiving openings 166; and 3) a needle discharge opening 167 to allow ejected needle members 18 to flow into the opening 59 of the needle discharge chute 51.

The spaced guide members 158 are provided with bearing members 170 in order to receive and support the spaced guide members 158 for reciprocal horizontal movement of the vertical support frame assembly 160 which is adapted to releasably receive and support the needle board assembly 14 thereon.

The vertical support frame assembly 160 is provided with a plurality, namely three, spaced parallel board support members 172 being interconnected by outer end wall support members 174 and having the needle board clamp assembly 176 connected to an outer one of the board support members 172.

Each board support member 172 is provided with a central support section 178 integral at outer ends thereof with end retainer sections 180.

The needle board clamp assembly 176 is provided with 1) stationary clamp members 171; 2) a movable clamp assembly 173; and 3) a clamp latch assembly 179.

Each clamp member 171 is of L-shape having an upper horizontal leg section engagable with an upper surface of the needle support board member 16 when in the clamped condition as shown in FIG. 1.

The movable clamp assembly 173 is provided with 1) a clamp plate member 177; 2) the clamp members 171 secured to upper edges of the clamp plate member 177; and 3) the clamp latch assembly 179. Each clamp latch assembly 179 is provided with an abutment pin member 181 mounted in the clamp plate member 177 and a pivotal latch assembly 183 is mounted adjacent thereto.

Each pivotal latch assembly 183 includes 1) a pivot pin member 185; 2) a spacer body member 187; and 3) a spacer bolt member 189. The spacer body member 187 is provided with a connector notch section 191 adaptable to be placed about the spacer bolt member 189 to hold the clamp plate member 177 against the adjacent board support member 172 in a clamped condition.

The frame locator assembly 175 includes a spaced set of elongated plate members 193 and a locator latch assembly 195. The plate members 193 are secured as by bolt members 197 to the main board support plate member 156 and provided with a plurality, namely four, spaced locator holes 199.

The locator latch assembly 195 includes a latch housing 201 and a latch pin 203 mounted for vertical axial movement in a hole 205 in the latch housing 201. The latch housing 201 is secured to an outer one of the board support members 172 of the movable needle board support plate member 156.

A pin drop slot 207 intersects the hole 205 in the latch housing 201 to receive a portion of the latch pin 203 therein when in a locked condition.

The latch pin 203 is of an L-shape having a main body section 207 connected to a lock arm 209 extended perpendicular and laterally therefrom.

The locator latch assembly 195 is shown in an unlatched condition in FIG. 1. When the latch pin 203 is rotated clockwise 90 degrees as shown in dotted lines in FIG. 12, the lock arm 209 drops into the pin drop slot 207 and a lower end of the main body section 207 extends below a lower surface of the main board support member 156 for insertion in a selected one of the locator holes 199 in the plate member 193.

The spacing of the locator holes 199 is predetermined to locate respective sections or rows of the needle members 18 in vertical alignment with the transverse support plate member 110 of the top plate support yoke assembly 72 prior to a needle removing function.

It is obvious that the locator latch assemblies 195 are movable along a longitudinal axis of respective elongated plate members 193, as shown by an arrow 211, having the latch pins 203 operable to be vertically aligned with respective ones of the locator holes 199.

Each guide post support and bearing assembly 152 includes a guide support housing member 184 having mounted thereon a bearing and spacer assembly 186. The guide support housing member 184 is provided with a guide post opening 188 and a laterally extended connector flange section 190.

The guide post opening 188 is operable to receive a respective one of the guide post members 76 therein to achieve accurate and controlled vertical movement of the needle board support frame assembly 150. The connector flange section 190 is provided with anchor holes 192 to receive bolt members 194 therein for securely anchoring to the main board support plate member 156 of the needle board support frame assembly 150.

The bearing and spacer assembly 186 includes a pair of bearing members 196 separated by a bearing spacer member 198 mounted within the guide support housing member 184 and engageable with an outer surface of a respective guide post member 76.

The actuator cam roller assembly 154 includes a pair of cam roller assemblies 202, each associated with a cam actuator member 208.

Each cam roller assembly 202 includes 1) a cam roller support housing 204 connected to the main board support plate member 156; 2) spaced, parallel roller connector lugs 206 connected to the cam roller support housing 204; and 3) a roller member 207 rotatably mounted on a roller support shaft 210 which, in turn, is mounted in roller connector holes 216 in the roller connector lugs 206.

Each roller member 207 is provided with an outer contact surface 209 which contacts an outer respective surface of the cam actuator member 208 during a method of operation.

Each cam actuator member 208 is provided with a central shaft connector opening 218 and a main cam body 220. The central shaft connector opening 218 is provided with a keyway slot section 222 to receive a keyway member 221 therein when attached to a main power drive shaft as will be noted.

The main cam body 220 is provided with an outer roller contact surface 224 having an arcuate start/stop section 226 integral with an initial elevational section 228 which is integral with a gradual elevational section 230 which, in turn, is integral with a maximum elevational section 232 which is integral with a drop shock section 234 which is then integral with the first arcuate start/stop section 226.

The outer roller contact surface 224 is engagable with the outer contact surface 209 of the roller member 207 for controlled reciprocal vertical movement of the needle board support frame assembly 150 with the needle board assembly 14 mounted thereon during a needle removing operation.

The cam actuator and power drive assembly 40 includes a power drive shaft assembly 244 which is connected to an undersurface of the top plate member 64 of the main support table frame assembly 34 and the power drive shaft assembly 244 is driven by a motor and gear box assembly 245.

The power drive shaft assembly 244 includes a power drive shaft member 246 which is rotatably mounted in a plurality, namely four, block bearing support assemblies 248 which are mounted against the lower surface of the top plate member 64 of the main support table frame assembly 34.

The power drive shaft member 246 includes a central driven section 250 integral at outer ends with outer drive sections 252. The central driven section 250 is connected in a conventional manner by a gear box connector portion 254 to the motor and gear box assembly 245.

Each outer drive section 252 is provided with a cam actuator portion 256 having respective ones of the cam actuator members 208 connected thereto for conjoint rotation therewith.

Each block bearing support assembly 248 is provided with a bearing spacer member 258 connected to pillow block bearing members 260 which are anchored through anchor bolts 261 to the top plate member 64.

The pillow block bearing members 260 are of a known nature having a central opening and bearing members therein to receive the power drive shaft member 246 therethrough for rotational support.

The motor and gear box assembly 245 is provided with a power drive motor member 262 operably connected through a reducer gear box member 264 to the power drive shaft member 246 and having a torque arm connector member 266 connected to the gear box assembly 245 and the main support table frame assembly 34.

The torque arm connector member 266 is of a conventional nature to relieve shocks and control torque during the initial starting of the power drive motor member 262.

The electrical drive and control assembly 42 includes 1) a control panel assembly 268; 2) an electrical schematic circuit diagram 270 illustrating connections to the control panel assembly 268, the air cylinder detent assemblies 74, and the power drive motor member 262; 3) a pneumatic schematic diagram 272 illustrating the control and operation of the air cylinder detent assemblies 74; and 4) a cam actuated proximity limit switch assembly 274 which controls movement and operation of the air cylinder detent assemblies 74 and energization of the power drive motor member 262 on rotation of the cam actuator member 208 to cause the reciprocal raising and lowering of the movable needle board support assembly 38.

Figure 10:
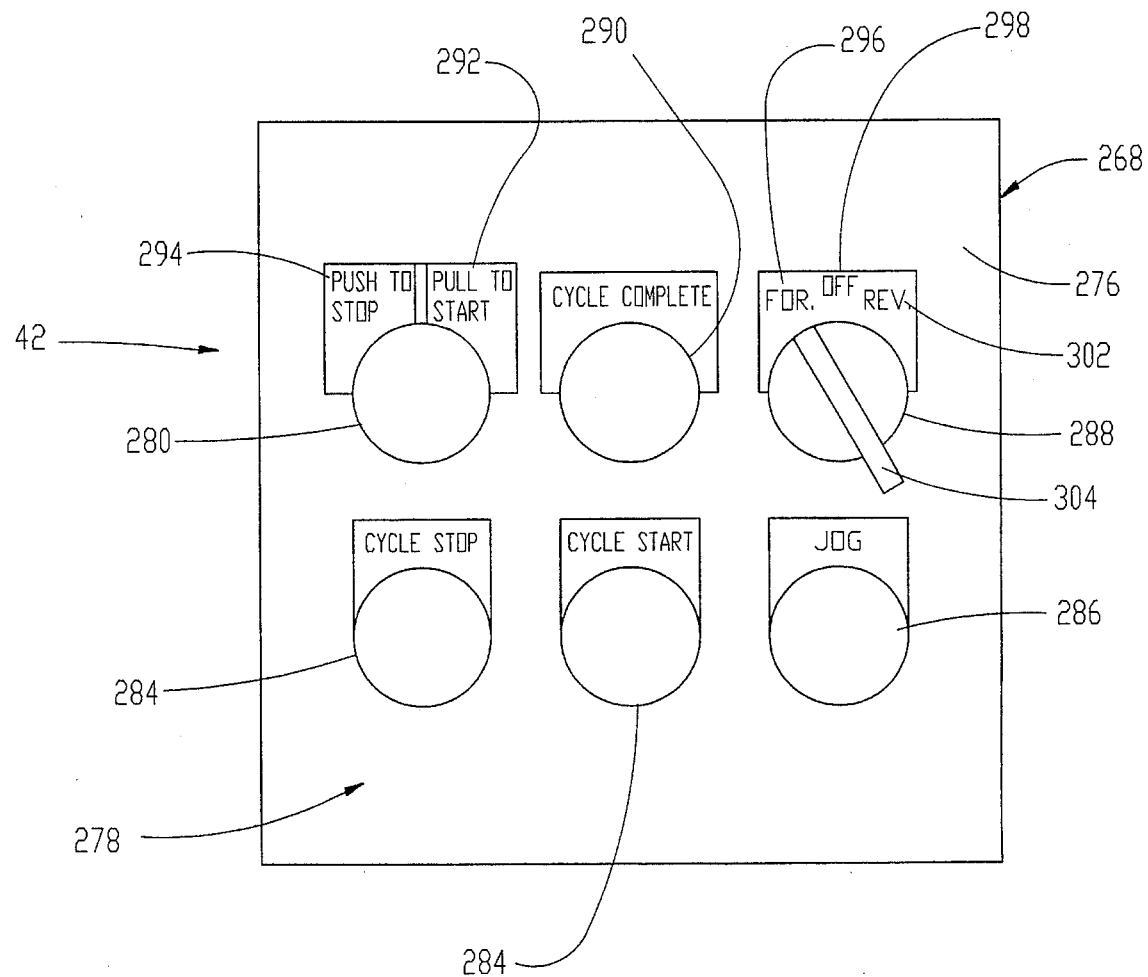
FIG. 10 is a front plan view of a control panel assembly of the electrical drive and control assembly of this invention.
Figure 11:
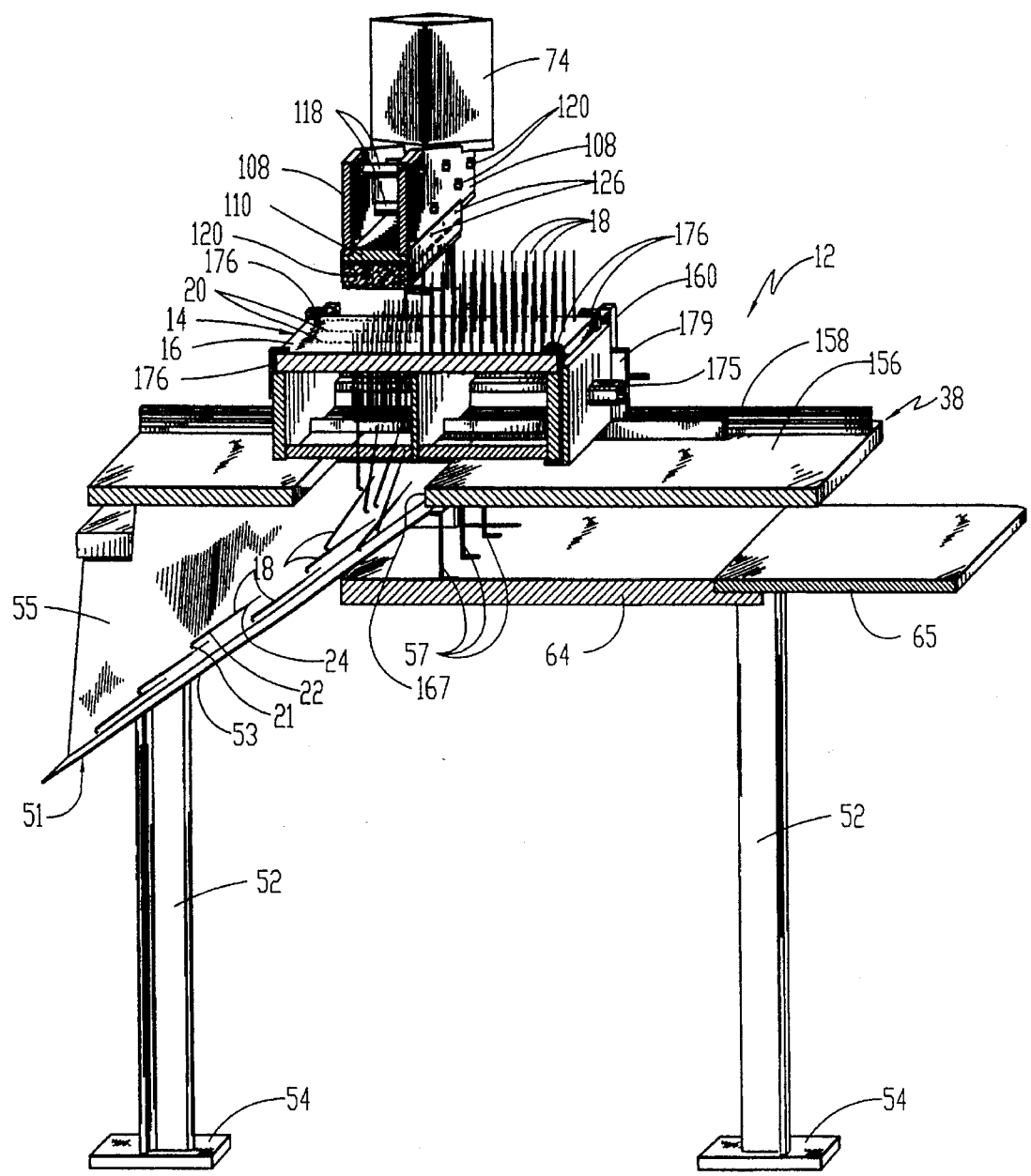
FIG. 11 is a fragmentary perspective schematic diagram illustrating a needle member removing operation of this invention.

On referring to FIG. 10, the control panel assembly 268 includes a panel enclosure housing 276 secured to the main support table frame assembly 34 (FIG. 1) and having an actuator switch and indicator assembly 278 mounted therein.

The actuator switch and indicator assembly 278 includes 1) a start/stop switch 280; 2) a cycle stop switch 282; 3) a cycle start switch 284; 4) a jog or momentary motion actuator switch 286; 5) a motor drive direction switch 288; and 6) a cycle completed indicator light 290.

The start/stop switch 280 is of a push-pull top having a start position 292 and a stop position 294.

The motor drive direction switch 288 has a forward position 296, an "off" position 298, and a reverse position 302. The motor drive direction switch 288 has a switch actuator arm 304 which is rotatable between the positions 296, 298, 302 depending on the motor drive direction of rotation desired from the power drive motor member 262.

Figure 8:
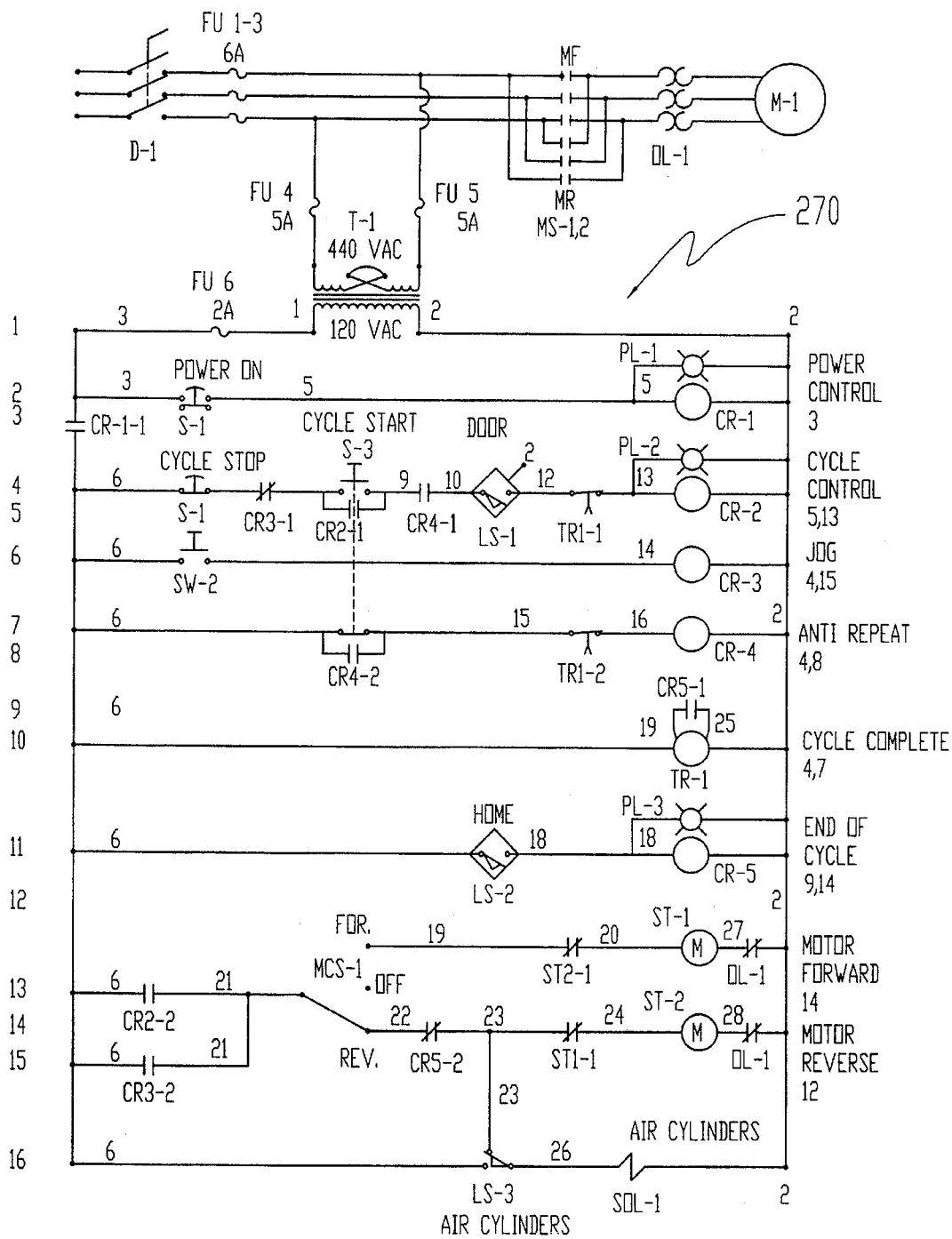
FIG. 8 is an electrical schematic of an electrical drive and control assembly of this invention.

On referring to FIG. 8 being an electrical schematic circuit or diagram 270 and FIG. 8A describing the components shown in FIG. 8, this is not a new and novel feature of this invention and presents a self-explanatory electrical circuit.

The needle board stripping press assembly 12 is equipped with both an automatic cycle and a jog or momentary motor actuator cycle.

In the automatic cycle mode, the cam actuator and power drive assembly 40 will cycle and stop in a start or home position when the proximity switch 295 is closed. At this time, a timer in the electrical schematic circuit 270 will not permit the start of another automatic cycle mode for a preset amount of time.

In the jog cycle, the needle board stripping press assembly 12 will only cycle when and while the jog switch 286 of the control panel assembly 268 is depressed.

The control panel assembly 268 includes the motor drive direction switch 288 with the forward drive position 296 and the reverse drive position 302. When the switch actuator arm 304 is in the forward drive position 296, an automatic cycle will occur when the cam actuator and power drive assembly 40 is energized.

In the reverse drive position 302, the cam actuator and power drive assembly 40 will be de-energized on reaching the home or start position.

Figure 9:
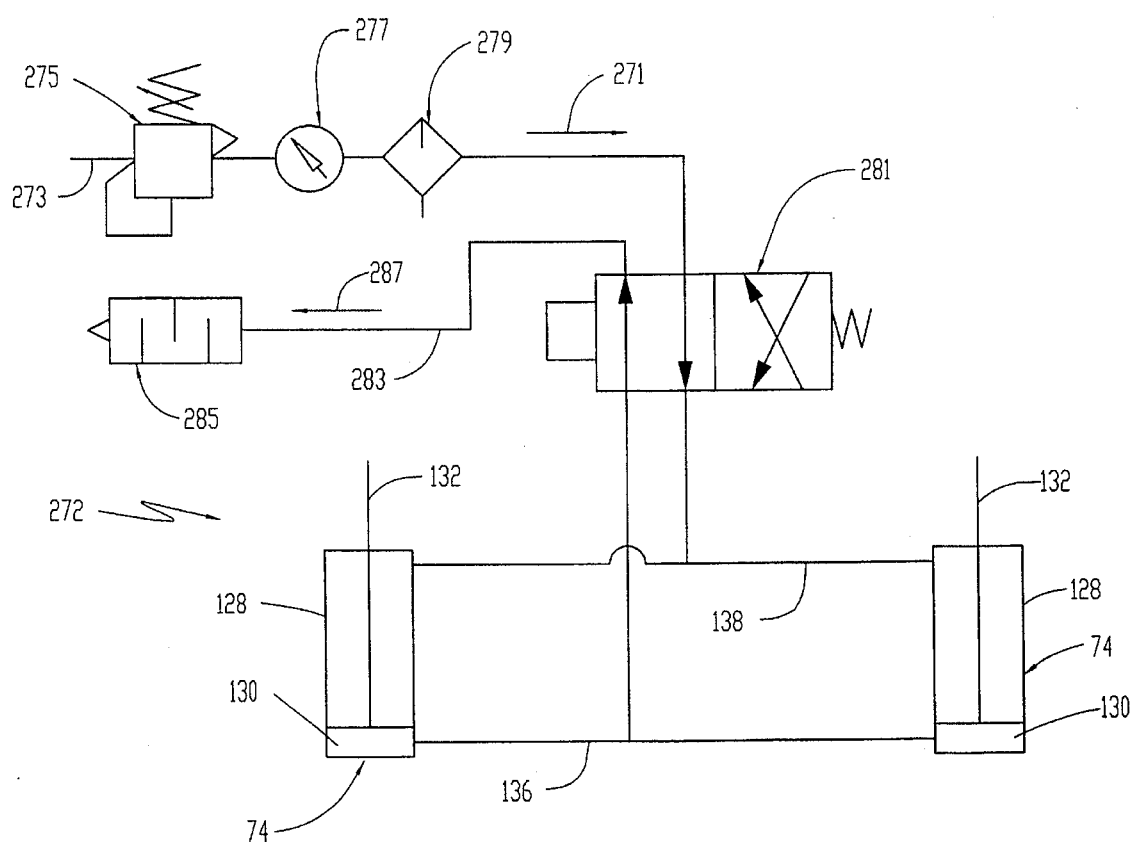
FIG. 9 is a pneumatic schematic illustrating operation of an air cylinder detent assembly of this invention.

On referring to FIG. 9, the pneumatic schematic diagram 272 sets forth operation of the air cylinder detent assemblies 74. A pressure air inlet line 273 is trained through a pressure regulator valve 275, a pressure gauge 277, a lubrication member 279, and into an electric solenoid valve 281 as noted by an arrow 271.

In the position of the solenoid valve 281 in FIG. 9, the pressure fluid is connected to the air discharge/inlet line 138 to hold the piston members 130 in the retracted condition. At this time, air between the piston members 130 and the upper walls 131 of the cylinder housing members 128 has been exhausted through the air discharge/inlet line 138, the solenoid valve 281, an exhaust line 283, and into an exhaust muffler 285 as noted by an arrow 287.

When the solenoid valve 281 is energized to move the piston members 130 and piston rod member 132 to an extended position, air pressure is applied from the air inlet line 273 to the air inlet/discharge line 136 and air is exhausted from the cylinder housing members 128, air discharge/inlet line 138, the exhaust line 283, and through the exhaust muffler 285.

On referring to FIG. 6, the cam actuated proximity switch assembly 274 includes 1) a proximity switch assembly 289 secured by bolt members to the bearing spacer member 258 on one of the block bearing support assemblies 248; and 2) a proximity cam assembly 291 secured as by welding or a keyway/key to the power drive shaft member 246 adjacent the proximity switch assembly 289.

The proximity switch assembly 289 includes a bracket member 293 secured to the bearing spacer member 258 and a proximity switch 295 adjustably mounted for longitudinal movement in the bracket member 293. The proximity switch 295 closes depending on rotation of the proximity cam assembly 291 to de-energize the power drive motor member 262 on completion of a cycle of operation.

The proximity cam assembly 291 includes a cam body 297 having a proximity cam member 299 secured thereto and a cam actuated cylinder switch 303. The proximity cam member 299 has an actuator surface 301 vertically aligned and spaced from the proximity switch 295. When the actuator surface 301 is positioned in close proximity to the proximity switch 295, the proximity switch 295 opens on rotation of the cam actuator member 208 to the start or home position.

The cam actuated cylinder switch 303 is secured by a bolt member to the bracket member 293 and has an actuator lever 305 engagable with an outer surface of the cam body 297.

As shown in FIG. 6, when the actuator lever 305 is in an off position the air cylinder detent assemblies 74 are de-energized. On rotation of the cam actuator member 208 as noted by the arrow 316, the actuator lever 305 remains extended in the off position until striking a detent actuator surface 307 to energize the air cylinder detent assemblies 74 for reasons to become obvious.

This energization continues until the cycle of operation is completed to the start or home position of FIG. 6 and the air cylinder detent assemblies 74 are de-energized.

The needle board stripping press apparatus 12 may be provided with a safety shield assembly known in the prior art to enclose the stationary top plate press assembly 36 and the movable needle board support assembly 38 for obvious operator safety reasons.

USE AND OPERATION OF THE INVENTION

In the use and operation of the invention on referring to FIG. 1, the needle board stripping press apparatus 12 is provided with the main support table frame assembly 34 having the stationary top plate press assembly 36 and the movable needle board support assembly 38 mounted thereon.

The needle board assembly 14 is securely mounted on the needle board support assembly 150 through the needle board clamp assembly 176 and, more specifically, the upper edges of the L-shaped stationary clamp members 171.

As illustrated in FIG. 1, the needle board support frame assembly 150 has two sections of multiple rows of the needle members 18 removed from the needle support board member 16. The ejected needle members 18 have been discharged through the needle discharge opening 167 into the needle discharge chute 51 to be received in a box or other similar container.

The frame locator assembly 175 is operable on movement of the pivot latch assembly 183 to the unlatched condition as shown in FIG. 1. This allows the entire needle board support frame assembly 150 to be moved as noted by an arrow 312 to a next or third horizontal position to position a third section of rows of the needle members 18 in a vertically aligned position under the transverse support plate member 110.

Figure 12:
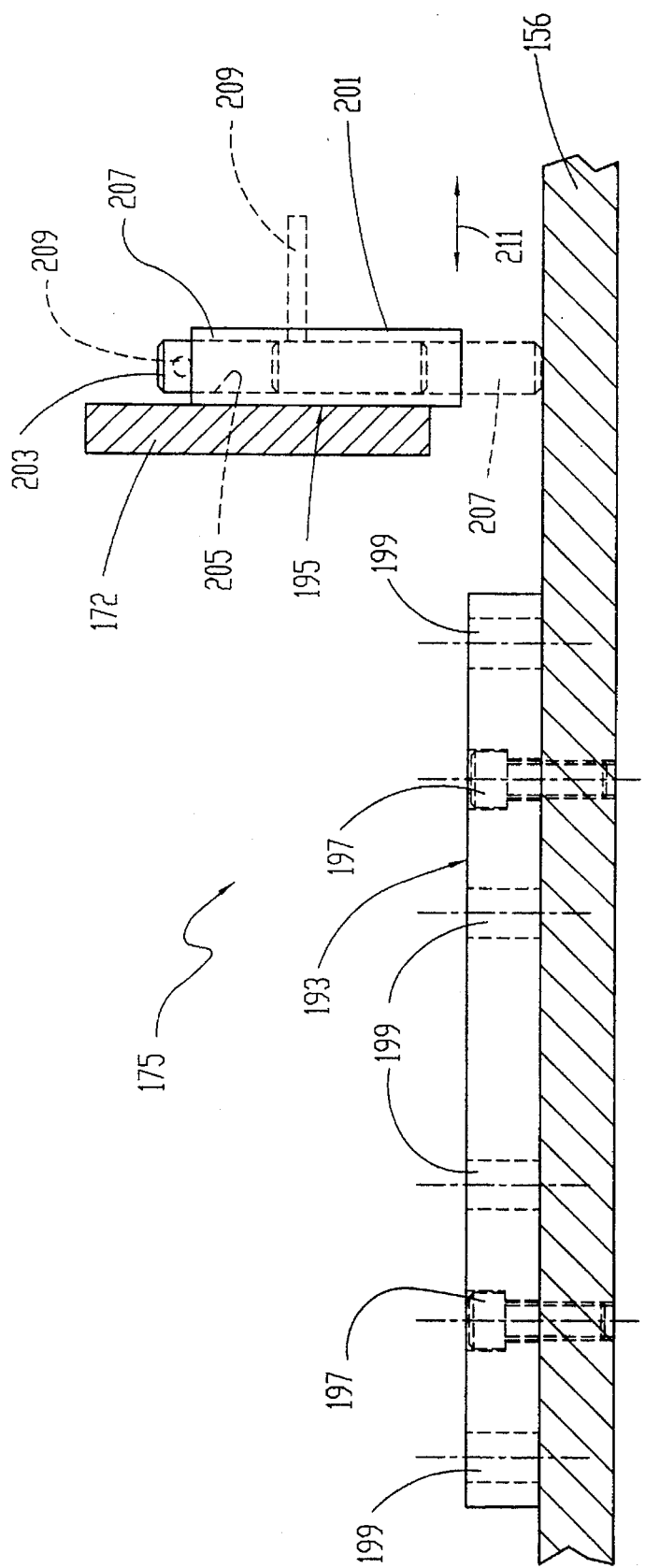
FIG. 12 is an enlarged sectional view taken along line 12—12 in FIG. 1 with certain elements deleted for the purpose of clarity.

As shown in FIG. 12, the frame locator assembly 175 is then operable to lower the latch pin 203 on 90 degree rotation thereof into a locator hole 199 in the plate member 193. This anchors the needle board support frame assembly 150 in the third position for subsequent removal of the needle members 18 in the third section of the rows of the needle members 18.

Figure 13:
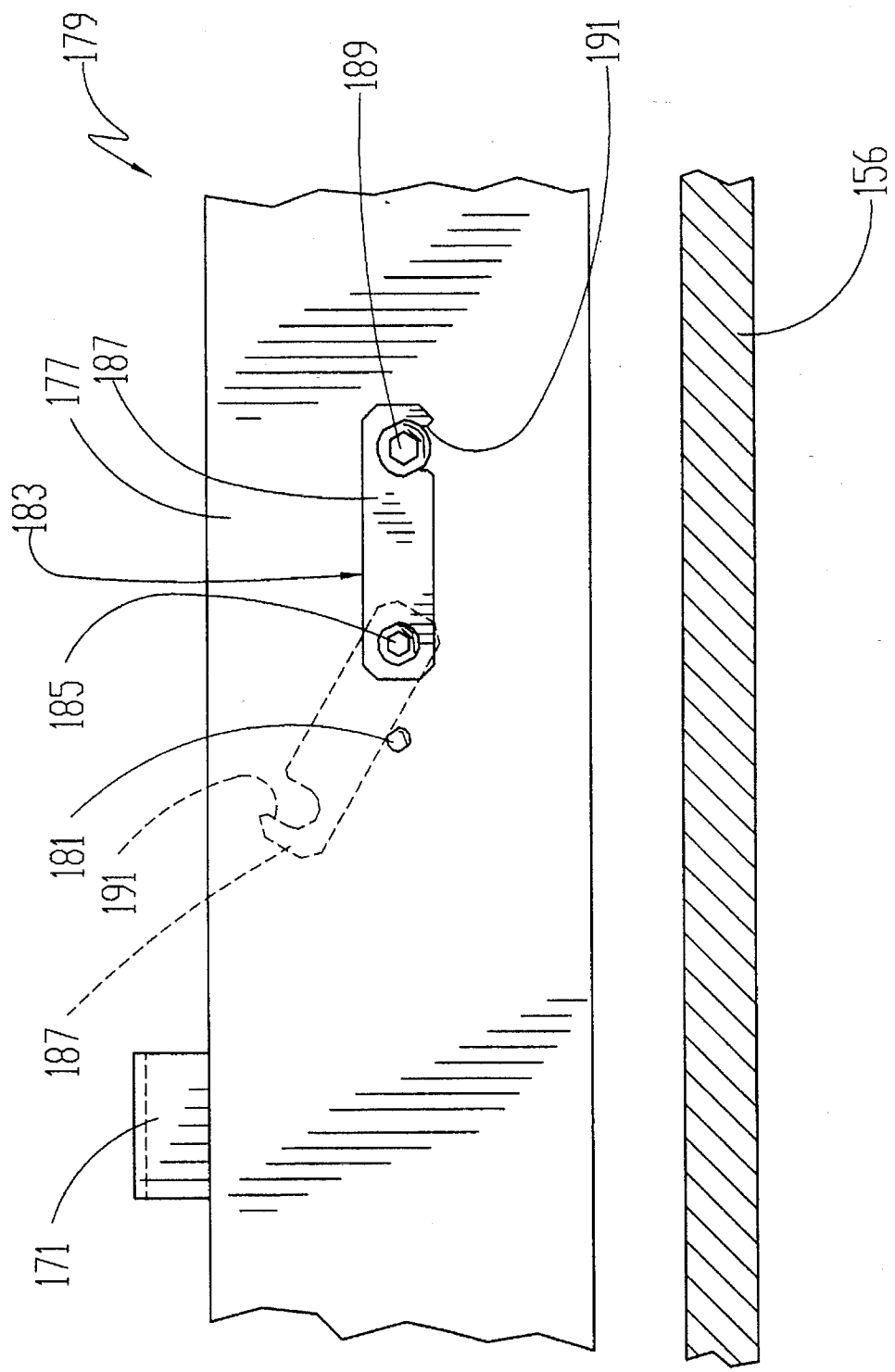
FIG. 13 is an enlarged sectional view taken along line 13—13 in FIG. 1.
Figure 17:
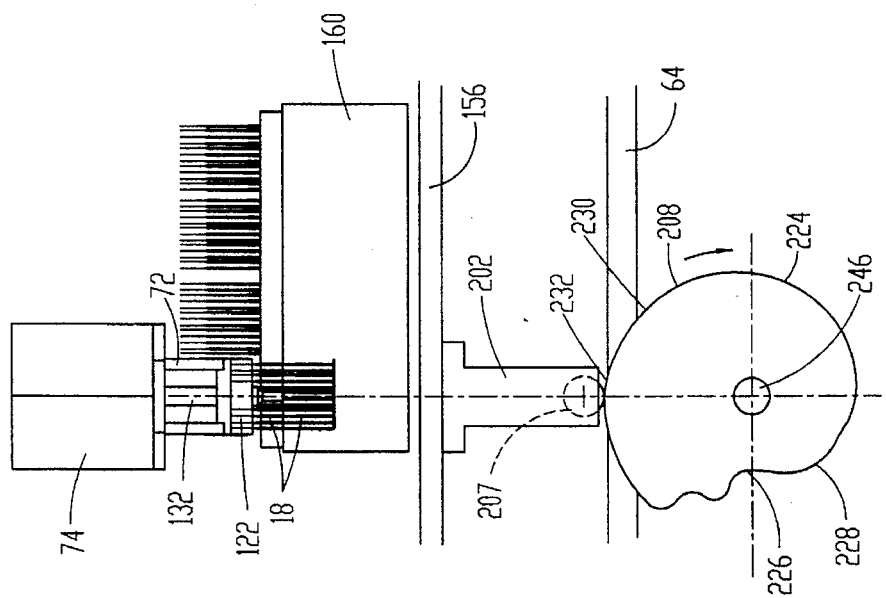

On referring to the schematic diagram of FIG. 13, a needle removing operation is illustrated whereupon the needle members 18 in a second section of rows of needle members 18 have been depressed and are shown as being discharged from the needle support board member 16 into the needle discharge chute 51 after a cycle of operation.

On referring to the schematic diagrams of FIGS. 14–19, inclusive, illustrating a method of use of the needle board stripping press apparatus 12, a first step is for a machine operator is to start from the position noted in FIG. 14 with the needle board assembly 14 anchored with a first section or rows of the needle members 18 in vertical alignment with the needle strike plate assembly 115 positioned adjacent the upper tips of the adjacent rows of needle members 18 to be removed.

FIG. 14 illustrates a home base or starting position with the roller member 207 resting in the arcuate start/stop section 226 of the cam actuator member 208. The machine operator would depress the start/stop switch 280 which would energize the power drive motor member 262 to start rotation of the power drive shaft member 246 to cause rotation as noted by arrow 314 of the cam actuator member 208. This causes the roller member 207 to start movement upwardly, as illustrated in FIG. 14, thus moving of the needle board assembly 14 upwardly.

The cam actuator member 208 continues to rotate with engagement of the roller member 207 with the gradual elevational section 230 to the position of FIG. 15. The needle support member 122 receives the initial penetrating section 24 of the needle members 18 to hold in an upright vertical condition to prevent bending thereof. Next, the outer penetrating end point 25 of the needle members 18 engage the bottom surface of the transverse support plate member 110 of the top plate support yoke assembly 72.

Figure 16:
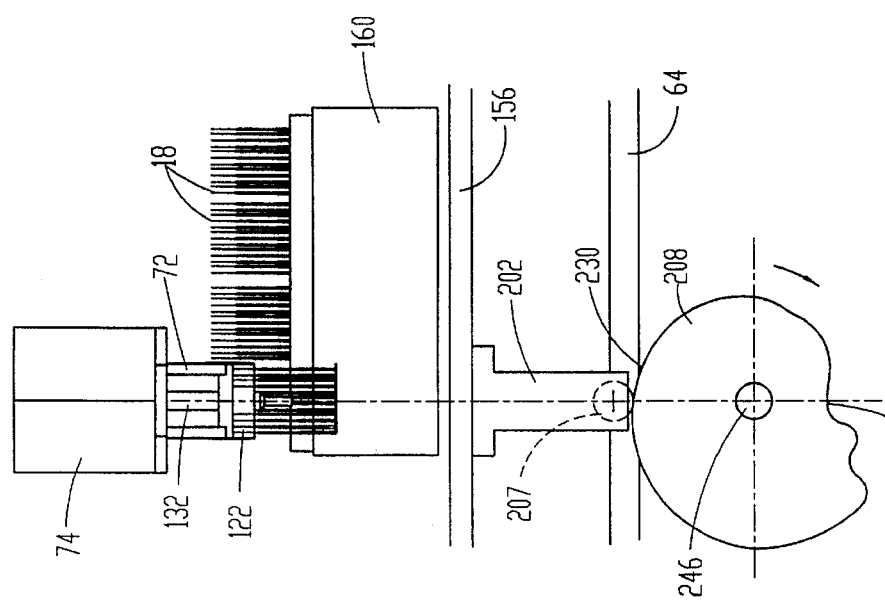

The cam actuator member 208 continues to rotate as noted by the arrow 316 as shown in FIG. 16 to cause the needle members 18 to be ejected from the needle support board member 16. This ejecting motion continues in FIG. 17 whereupon the roller member 207 is contacting the maximum elevational section 232 on the cam actuator member 208.

Figure 18:
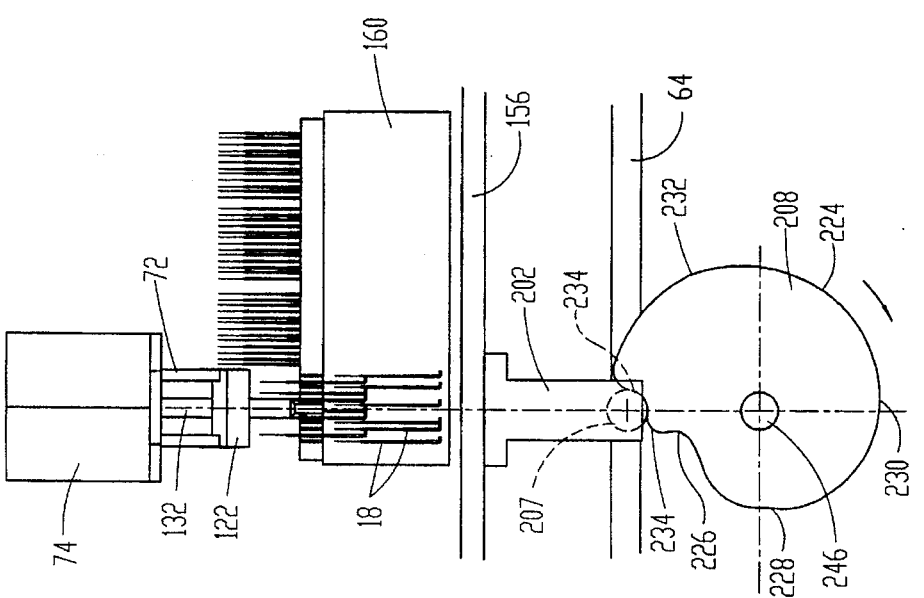

At the position of FIG. 18 and through the final ninety (90) degree rotation of the cam actuator member 208, the air cylinder detent assemblies 74 are operable through the cam action of the cam actuated cylinder switch 303 whereupon the piston rod member 132 of each air cylinder detent assembly 74 moves downwardly to contact respective spaced end wall support members 174 of the vertical support frame assembly 160. This operates to provide a positive downward pressure against the needle board support frame assembly 150 to assure downward movement. This overcomes resistance to downward movement due to friction contact of the initial penetrating sections 24 of the needle members 18 in the needle support member 122.

As noted in FIG. 18, some of the needle members 18 have not been ejected from the needle support board member 16. This is caused by the resistance to movement of the needle members 18 in the needle support member 122 being greater than the resistance to movement of the needle members 18 in the needle support holes 20 in the needle support board member 16.

The needle members 18 still connected to the needle support board member 16 (FIG. 18) are readily ejected therefrom by a second or third recycling operation set forth in FIGS. 14–19.

Figure 19:
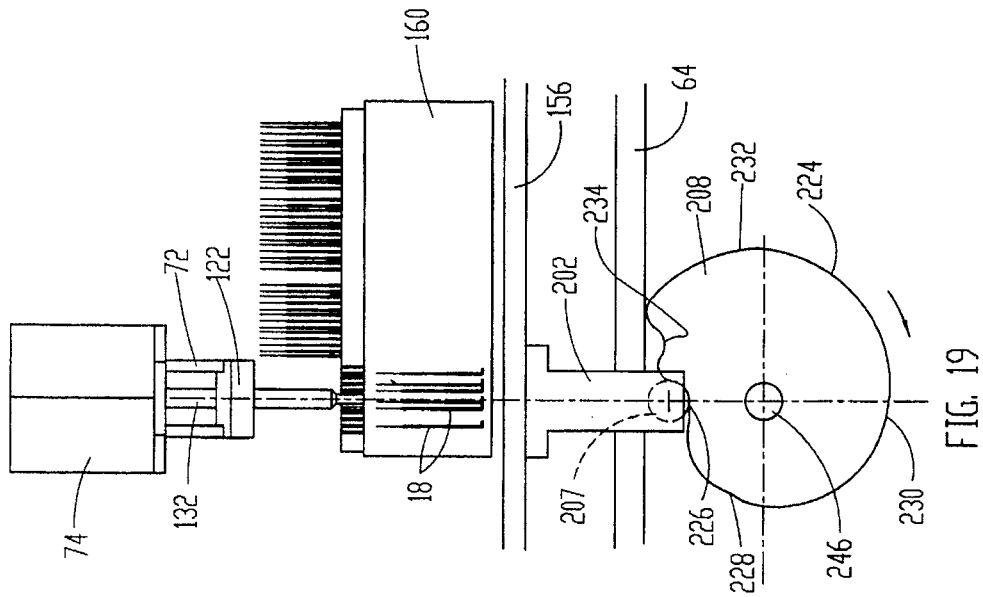

The final ejection of the needle members 18 from the needle support board member 16 is illustrated in FIG. 19 with the needle members 18 discharged into the needle discharge chute 51 and the air cylinder detent assemblies 74 will move to the retracted position of FIG. 14.

At this time, the roller member 207 reaches its home or starting position within the arcuate start/stop section 226 which then ceases energization of the power drive motor member 262 and subsequent rotation of the cam actuator member 208 to complete a cycle of operation.

On referring to FIG. 10, the control panel assembly 268 through the actuator switch and indicator assembly 278, is operable by a machine operator to pull out the start/stop switch 280 to energize the entire system.

The start/stop switch 280 can be pushed inwardly at any time to the stop position 294 to de-energize the entire system.

The cycle start switch 284 operates to start the cycle and, when the cycle is complete, the cycle completed indicator light 290 will be energized.

The cycle stop switch 282 is operable to stop the method of operation at any time during a needle removing ejection cycle.

The jog or momentary motor actuator switch 286 is operable on depression to rotate the cam actuator member 208 by energization of the power drive motor member 262 as long as the jog or momentary motor actuator switch 286 is being depressed.

The motor drive direction switch 288 is operable through the switch actuator arm 304 to either be in a forward drive position 296, a motor stop position 298, or a reverse drive position 302 which is necessary in case of a possible malfunction during the needle ejection process.

The method of use of the needle board stripping press apparatus 12 in a needle member removing operation comprises numerous steps being 1) mounting a needle board assembly 14 having a plurality of needle members 18 connected to a needle support board member 16 onto a main support table frame assembly 34; 2) clamping the needle board assembly 14 securely to the movable needle board support assembly 38; 3) moving the movable needle board support assembly 38 laterally horizontally to position a section of a plurality of rows of needle members 18 in vertical alignment with a top plate support yoke assembly 72 of a stationary top plate press assembly 36; 4) actuating a control panel assembly 268 through first energization of a start/stop switch 280 and then depressing a cycle start switch 284; 5) rotating a cam actuator member 208 which contacts a roller member 207 to move the needle board support frame assembly 150 in an upward direction with the needle members 18 engaging a needle strike plate assembly 115 whereupon initial penetrating sections 24 of the needle members 18 penetrate a needle support member 122; 6) continuing rotation of the cam actuator member 208 whereupon the initial penetrating section 24 of the needle members 18 is completely embedded, surrounded, and supported by the needle support member 122; 7) continuing further rotation of the cam actuator member 208 to place the outer penetrating end point 25 of the needle members 18 into contact with a rigid transverse support plate member 110 of the top plate support yoke assembly 72; 8) continuing rotation of the cam actuator member 208 which pushes the needle members 18 downwardly and outwardly of the needle support board member 16; 9) continuing rotation of the cam actuator member 208 to achieve a shock movement action due to the configuration of an outer roller contact surface 224 of the cam actuator member 208; and 10) completing the cycle whereupon the roller member 207 is engaged in a start/stop section 226 of the cam actuator member 208 to cease power to the power drive motor member 262 and, thus, rotation of the cam actuator member 208.

The needle board stripping press apparatus 12 is a substantial improvement over the prior art means of manually removing the needle members 18 from the needle support board member 16 which was very labor intensive and resulted in considerable machinery down time in the textile or other related industries.

The needle board stripping press apparatus is sturdy in construction; economical to manufacture; reliable in operation; not requiring a skilled operator to operate same; substantially maintenance free; and utilizing method steps to achieve the new and novel function of this invention.

While the invention has been described in conjunction with preferred specific embodiments thereof, it will be understood that this description is intended to illustrate and not to limit the scope of the invention, which is defined by the following claims:

I claim:

1. A needle board stripping press apparatus operable to remove a plurality of needle members simultaneously from a needle board assembly, comprising:

a) main support table frame assembly;
   b) a top plate press assembly connected to said main support table frame assembly;
   c) a needle board support assembly adapted to receive the needle board assembly mounted thereon and operably connected to said top plate press assembly;
   d) means to move said top plate press assembly relative to said needle board support assembly to remove said needle members from the needle board assembly;
   e) said top plate press assembly includes a support plate member selectively engageable with the needle members in the needle board assembly;
   f) said needle board support assembly selectively movable laterally of said main support table frame assembly and vertically relative to said support plate member to place the needle members in contact with said support plate member to eject same from the needle board assembly; and
   g) said means to move includes a cam actuator and power drive assembly mounted on said main support table frame assembly and operably connected to said needle board support assembly to cause selective vertical movement thereof for removing the needle members from the needle board assembly.

2. A needle board stripping press apparatus as described in claim 1, wherein:

a) said cam actuator and power drive assembly includes 1) a power drive shaft assembly having a power drive shaft member rotatably connected to said main support table frame; and 2) a motor and gear box assembly connected to said power drive shaft member for selective rotation and subsequent movement of said needle board support assembly.

3. A needle board stripping press apparatus as described in claim 1, including:

a) an electrical drive and control assembly connected to said cam actuator and power drive assembly for selective, controlled operation thereof.

4. A needle board stripping press apparatus as described in claim 2, wherein:

a) said needle board support assembly includes an actuator cam roller assembly having a cam actuator member connected to said power drive shaft member; and
   b) said cam actuator member rotatable to move said needle board support assembly during removal of the needle members from the needle board assembly.

5. A needle board stripping press apparatus as described in claim 4, wherein:

a) said cam actuator member includes a main cam body with an irregular outer roller contact surface engageable with said needle board support assembly; and
   b) rotation of said roller contact surface from a start position causes said needle board support assembly to move vertically to a maximum position, drop downwardly, move upwardly, and downwardly to the start position during removal of the needle member from the needle board assembly.

6. A needle board stripping press apparatus operable to remove a plurality of needle members simultaneously from a needle support board member, comprising:

a) a main support table frame assembly having a top support plate assembly;
   b) a top plate press assembly connected to said main support table frame assembly and having a support plate member;
   c) a needle board support assembly adapted to receive the needle support board member mounted thereon and operably connected to said top plate press assembly for selective movement toward said support plate member;
   d) means to move said needle board support assembly and the needle board assembly mounted thereon vertically relative to said support plate member to place the needle members into engagement with said support plate member to cause ejection of the plurality of the needle members from the needle support board member; and
   e) said means to move includes a cam actuator and power drive assembly connected to said top support plate assembly.

7. A needle board stripping press apparatus as described in claim 6, wherein:

a) said top plate press assembly includes a needle support member of a needle penetratable material secured to said support plate member;
   whereby movement of said needle board support assembly causes outer ends of the needle members to penetrate said needle support member and firmly hold prior to the needle members striking a rigid said support plate member for ejection from the needle support board member.

8. A needle board stripping press apparatus as described in claim 6, wherein:

a) said needle board support assembly includes 1) a vertical support frame assembly to receive and support the needle support board member thereon; and 2) a clamp assembly connected to said vertical support frame assembly to releasably secure the needle support board member to said vertical support frame assembly; and
   b) said needle board support assembly includes a frame locator assembly mounted on said vertical support frame assembly and said needle board support assembly operable to selectively position and anchor said needle board support assembly after the selective movement toward said support plate member.

9. A needle board stripping press apparatus as described in claim 6, wherein:

a) said cam actuator and power drive assembly includes a power drive shaft member connected to a motor and gear box assembly for controlled rotation thereof;
   b) said needle board support assembly includes an actuator cam roller assembly moving a cam actuator member mounted on said power drive shaft member; and
   c) said cam actuator member engageable with said needle board support assembly to cause controlled vertical movement thereof during a needle member removing operation.

10. A needle board stripping press apparatus as described in claim 9, wherein:
   a) said cam actuator member having an outer contact surface of irregular shape and, on rotation of said cam actuator member, causes said needle board support assembly to 1) move upwardly toward said support plate member into engagement with the needle members; 2) move downwardly relative to said support plate member; 3) move suddenly upwardly to shock the needle members to assist removal from the needle support board member; and 4) move to a start position to complete a cycle of a needle member removal operation.

11. A needle board stripping press apparatus as described in claim 6, wherein:
   a) said support plate member having an outer needle support member mounted thereon constructed of layers of a felt material initially penetrated by the needle members.

12. A needle board stripping press apparatus operable to remove needle members from a needle support board member, comprising:
   a) a main support table frame assembly having a top support plate member;
   b) a top plate press assembly including a guide post assembly connected to said top support plate member and a top plate support yoke assembly connected to said guide post assembly;
   c) a needle board support assembly having a needle board support frame assembly connected to said guide post assembly for reciprocal movement thereon;
   d) said needle board support frame assembly includes a board support plate member having a support frame assembly mounted thereon for reciprocal movement and adapted to receive and support the needle support board member thereon;
   e) drive means connected to said top support plate member and operably connected to said needle board support assembly to selectively cause reciprocal movement of said needle board support assembly on said guide post assembly; and
   f) control means connected to said drive means to selectively control the reciprocal movement of said needle board support assembly on said guide post assembly;
   whereby said support frame assembly is movable on said board support plate member to place the needle members in alignment with said top plate support yoke assembly; and said control means is operable to actuate said drive means and move said needle board support frame assembly toward said top plate support yoke assembly which engages the needle members to eject from the needle support board member.

13. A needle board stripping press apparatus as described in claim 12, wherein:
   a) said top plate support yoke assembly includes a support plate member with a material support housing supporting a needle support member connected thereto;
   b) said needle support member first engageable with outer ends of the needle members to firmly hold in spaced, parallel, axial aligned conditions;
   c) said support plate member of a rigid material to engage the needle members emerging from said needle support member and force ejection of the needle members from the needle support board member.

14. A needle board stripping press apparatus as described in claim 13, wherein:
   a) said needle support member of a needle penetratable material operable to hold penetrating needle members in an upright, non-bending position prior to contact of the needle members with said support plate member.

15. A needle board stripping press apparatus as described in claim 12, wherein:
   a) said needle board support assembly includes 1) a needle board clamp assembly to secure the needle support board member thereon; and 2) a frame locator assembly to anchor in a selected reciprocal movement position.

16. A needle board stripping press apparatus as described in claim 12, wherein:
   said top plate press assembly includes a detent assembly mounted on said top plate support yoke assembly; and
   b) said detent assembly includes a detent member selectively engagable with said needle board support frame assembly to assist in removing the needle members from the needle support board member.

17. A needle board stripping press apparatus operable to remove a plurality of needle members simultaneously from a needle board assembly, comprising:
   a) a main support table frame assembly;
   b) a top plate press assembly connected to said main support table frame assembly;
   c) a needle board support assembly adapted to receive the needle board assembly mounted thereon and operably connected to said top plate press assembly;
   d) means to move said top plate press assembly relative to said needle board support assembly to remove said needle members from the needle board assembly; and
   e) said means to move includes an actuator and power drive assembly connected to said needle board support assembly to cause selective vertical movement thereof.

18. A needle board stripping press apparatus as described in claim 17, wherein:
   a) said top plate press assembly includes a support plate member selectively engagable with the needle members in the needle board assembly; and
   b) said needle board support assembly selectively movable laterally of said main support table frame assembly and vertically relative to said support plate member on engagement with said actuator and power drive assembly to place the needle members in contact with said support plate member to eject same from the needle board assembly.

19. A needle board stripping press apparatus as described in claim 17, wherein:
   a) said actuator and power drive assembly includes 1) a power drive shaft assembly having a power drive shaft member rotatably connected to said main support table frame; and 2) a motor and gear box assembly connected to said power drive shaft member for selective rotation and subsequent movement of said needle board support assembly.

20. A needle board stripping press apparatus as described in claim 19, wherein:
   a) said needle board support assembly includes a cam actuator member connected to said power drive shaft member; and b) said cam actuator member rotatable to move said needle board support assembly during removal of the needle members from the needle board assembly.

21. A needle board stripping press apparatus as described in claim 20, wherein:
 a) said cam actuator member includes a main cam body with an irregular outer roller contact surface engageable with said needle board support assembly; and
 b) rotation of said roller contact surface from a start position causes said needle board support assembly to move vertically to a maximum position, drop downwardly, move upwardly, and downwardly to the start position during removal of the needle members from the needle board assembly.

* * * * *